United States Patent
Muralimanohar (10) Patent No.: US 10,241,971 B2
(45) Date of Patent: Mar. 26, 2019

(54) HIERARCHICAL COMPUTATIONS ON SPARSE MATRIX ROWS VIA A MEMRISTOR ARRAY

(71) Applicant: Hewlett Packard Enterprise Development LP, Houston, TX (US)

(72) Inventor: Naveen Muralimanohar, Santa Clara, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 139 days.

(21) Appl. No.: 15/380,269

(22) Filed: Dec. 15, 2016

(65) Prior Publication Data

US 2018/0173677 A1 Jun. 21, 2018

(51) Int. Cl.
G06F 17/16 (2006.01)
G06F 7/523 (2006.01)
G06F 7/544 (2006.01)

(52) U.S. Cl.
CPC ............ *G06F 17/16* (2013.01); *G06F 7/523* (2013.01); *G06F 7/5443* (2013.01)

(58) Field of Classification Search
None
See application file for complete search history.

(56) References Cited

U.S. PATENT DOCUMENTS

| | | | |
|---|---|---|---|
| 5,065,339 A | 11/1991 | Vassiliadis et al. | |
| 8,433,736 B2 | 4/2013 | Huang et al. | |
| 8,862,653 B2 | 10/2014 | Bakos | |
| 9,058,302 B2 | 6/2015 | Magerlein | |
| 9,317,482 B2 | 4/2016 | Davis et al. | |
| 9,830,302 B1 * | 11/2017 | Rub | .......... G06F 17/16 |

(Continued)

FOREIGN PATENT DOCUMENTS

WO WO-2016064406 4/2016

OTHER PUBLICATIONS

Hu, M. et al.; "Dot-product Engine for Neuromorphic Computing: Programming 1t1m Crossbar to Accelerate Matrix-vector Multiplication"; Mar. 3, 2016; 7 pages.

(Continued)

*Primary Examiner* — Michael D. Yaary
(74) *Attorney, Agent, or Firm* — Hewlett Packard Enterprise Patent Department (57) ABSTRACT

Hierarchical computation on sparse matrix rows is disclosed. One example is a circuit including a sparse row processor to identify a sparse row of a matrix, where the identified row has a number of non-zero entries less than a threshold, associate a sub-vector of an input vector with a sub-row of the identified row, where the sub-row comprises the non-zero entries of the identified row, and where entries in the sub-vector correspond to the non-zero entries in the identified row in a multiplication operation, and map entries in the matrix to an engine formed from a memristor array. A stream buffer queues sub-vectors based on a position of associated sub-rows of identified sparse rows. The engine computes analog multiplication results between sub-rows and their associated sub-vectors, where each column of the array is configured to hierarchically compute multiple multiplication results based on the queue.

16 Claims, 6 Drawing Sheets

(56) References Cited

U.S. PATENT DOCUMENTS

| | | |
|---|---|---|
| 2006/0268598 A1 | 11/2006 | Snider |
| 2012/0109866 A1 | 5/2012 | Modha |
| 2013/0028004 A1 | 1/2013 | Snider |
| 2014/0108481 A1 | 4/2014 | Davis et al. |
| 2014/0172937 A1* | 6/2014 | Linderman .............. G06G 7/16 708/607 |
| 2014/0268994 A1 | 9/2014 | Rose et al. |
| 2014/0365548 A1 | 12/2014 | Mortensen et al. |
| 2016/0259826 A1 | 9/2016 | Acar et al. |

OTHER PUBLICATIONS

International Searching Authority, The International Search Report and the Written Opinion, PCT/US2016/014342, dated Sep. 30, 2016, 10 Pgs.

Marshal, A. et al., "Architecting a Large-Scale Elastic Environment", < http://www.nimbusproject.org/files/marshall-icsoft2012.pdf > (Research Paper), May 4, 2012, 10 pages.

* cited by examiner

HIERARCHICAL COMPUTATIONS ON SPARSE MATRIX ROWS VIA A MEMRISTOR ARRAY

BACKGROUND

A resistive memory array may be utilized to perform analog computations that exploit the fundamental relationship between row voltage and column current in a resistive mesh to realize an analog multiply-accumulate unit. The memory array is typically organized as a grid of cells interconnected by horizontal and vertical wires, referred to as word lines and bit lines. With emerging resistive memories, this may be further developed to build a powerful multiply-accumulate unit within the memory. For instance, the fundamental relationship between a row access voltage and the resulting bit line current may act as an analog multiplier of row voltage and cell conductance. Instead of accessing a single row as performed for loading and storing data, multiple rows may be activated concurrently.

DETAILED DESCRIPTION

A Dot-Product Engine (DPE) is a powerful hardware primitive to accelerate matrix-vector multiplication. Memristor arrays are employed as computing engines where cell conductance and voltage values perform an analog multiplication between vectors representing the respective values. The vectors from the input matrices are generally greater than the size of the memristor arrays and may therefore be broken into smaller units (e.g., clusters operating on sub matrices) to accommodate the array size and then combined via a parallel pipelined architecture to facilitate computational speed. For such an architecture, the input matrix is first split into a number of submatrices ("submats") such that the number of rows and columns in a submat is a function of the number of DPE rows and columns. Each submat is then split into bitslices. Finally, the submats are mapped to DPEs. A group of DPEs may share a set of peripheral circuits such as local vector buffer, partial result buffer, ADCs, and h-tree interconnect to form a cluster.

While it may be generally faster and more efficient than existing techniques, efficiency of the DPE relies on the density of the input matrix. Accordingly, utilizing a DPE directly to operate on sparse matrices may result in a significant increase in latency and energy consumption. In some examples, the sparsity of a matrix, measured as a ratio of the number of non-zero elements in matrix to the total matrix size, may be 0.1-0.5%. Additional, and all alternative sparsity thresholds may be utilized based on specific use cases. Since a DPE maps every input element of the matrix to one or more memristor cells, a poor matrix density will generally lead to inefficient use of DPE resources, which may in turn result in low performance, high energy consumption, and large area overhead.

In some examples, elimination of all zero submats may lead to an overall utilization of less than 5% of the DPE. However, even though these applications may utilize matrices with thousands of rows and columns, each row generally has very few non-zero elements, making it feasible to handle an entire row in a few clusters—in most cases with just one cluster. Accordingly, instead of splitting a matrix into submats of specific number of rows and columns, it may be more efficient to map each row of a sparse matrix to one or more clusters, and operate each cluster with different sets of input vectors to perform matrix-vector multiplication. Since a cluster is designed to operate on a submat, this may require enhancements to the cluster pipeline and a list of peripheral circuits. Rows that require non-trivial number of clusters may be handled using via submat based computations. As described herein, a combination of row-wise and submat based computations may be utilized for matrices with large sparsity.

In a DPE, to perform a multiplication of matrix G with vector V, the elements of G are mapped in to the DPE array. This may be achieved by transforming each element to a proportional conductance of a memristor cell. The input matrix may be analyzed, and the density of each row in the input matrix may be determined. If the density or non-zero elements in a row is below a certain threshold, then that row may be mapped to one or more clusters. If the density in the row is above a certain threshold, then the set of such high density rows may be divided into submats, and processed via existing techniques.

The input vector V is then fed into a digital to analog converter (DAC) to get the analog voltage equivalent of the vector V. Finally, the dot-product is performed in the analog domain. DPE achieves high performance by doing this entire operation in a single cycle, and it achieves high efficiency by doing multiplication and addition in the analog domain.

An analog to digital converter (ADC) (or converters) generate a digital value for the first and second analog multiplication results computed by the first and second engines. These results are then combined in a pipeline that includes a shifter to shift the digital value of first analog multiplication result a predetermined number of bits to generate a shifted result. An adder then adds the shifted result to the digital value of the second multiplication result to generate a combined multiplication result from the first sub-matrix and the second sub-matrix. A plurality of such clusters may be configured to process the input matrix. Resources such as ADC's may be shared between clusters to conserve power and integrated circuit resources, for example. Various configuration options may be provided to dynamically configure operations of the clusters, digital converters, shift operations, and other aspects of the pipelined architecture.

As described in various examples herein, hierarchical computations on sparse matrix rows via a memristor array is disclosed. One example is a circuit including a sparse row processor to identify a sparse row of a matrix, where the identified row has a number of non-zero entries less than a threshold, associate a sub-vector of an input vector with a sub-row of the identified row, where the sub-row comprises the non-zero entries of the identified row, and where entries in the sub-vector correspond to the non-zero entries in the identified row in a multiplication operation, and map entries in the matrix to an engine formed from a memristor array. A stream buffer queues sub-vectors based on a position of associated sub-rows of identified sparse rows. The engine computes analog multiplication results between sub-rows and their associated sub-vectors, where each column of the array is configured to hierarchically compute multiple multiplication results based on the queue.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
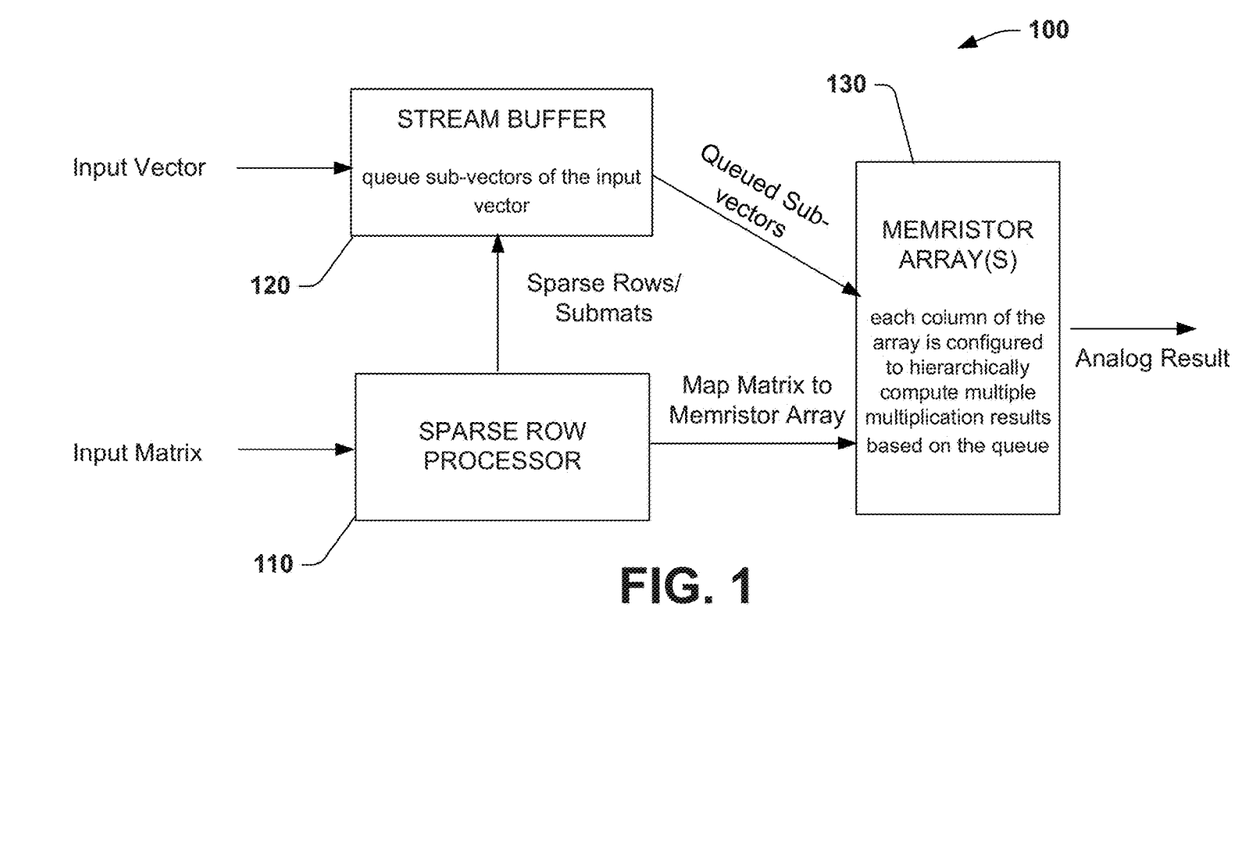
FIG. 1 is a functional block diagram illustrating one example of a circuit for hierarchical computations on sparse matrix rows via a memristor array.

FIG. 1 is a functional block diagram illustrating one example of a circuit 100 for hierarchical computations on sparse matrix rows via a memristor array. The circuit 100 includes a sparse row processor 110, a stream buffer 120, and an engine (or engines) formed from a memristor array 130 to compute an analog multiplication result shown as ANALOG RESULT between an input vector and an input matrix.

The sparse row processor 110 receives an input matrix, and identifies a sparse row of the input matrix, where the identified row has a number of non-zero entries less than a threshold. This threshold may depend on both digital floating point overheads and the cost of converting back and forth between digital and analog values. Consider an input matrix such as the one shown below.

$$\begin{vmatrix} 2 & 0 & 0 & 0 & 0 & 7 & 0 & 0 & 0 & 0 \\ 0 & 1 & 0 & 0 & 0 & 0 & 4 & 0 & 0 & 3 \\ 4 & 0 & 1 & 8 & 1 & 0 & 9 & 0 & 1 & 0 \\ 0 & 9 & 0 & 8 & 0 & 0 & 7 & 0 & 9 & 0 \end{vmatrix} \quad \text{(Eqn. 1)}$$

A hypothetical DPE may be of size 2×2. A cluster may generally include 32 DPEs. The threshold may, in some examples, be set to be 40%. A sparsity of a row may be determined as a ratio of a number of non-zero entries in the row to the total number of entries in the row. In some examples, if the sparsity of a row is <40%, then the matrix is to be operated upon row wise; whereas, if the sparsity of a row is greater than 40%, then submats may be determined to compute the result. The matrix is first divided into a set of submats (also referred to as sub-matrixes), where a submat is a contiguous section of the matrix with dimensions similar to or smaller than a respective engine. Although the example assumes that a DPE is configured to handle a one bit cell, the technique may be applied to multibit cells as well. In actual applications, the density may be typically <1% and a DPE may be sized to handle 64-256 rows and columns.

In the matrix of Eqn. 1, row 1 has a sparsity of 2/10 or 20%. Accordingly, the first row involving elements 2 and 7 will not be split into bitslices and mapped to DPEs within a cluster. Similarly, row 2 has a sparsity of 3/10 or 30%. Accordingly, the second row involving elements 1, 4, and 3 will not be split into bitslices and mapped to DPEs within a cluster. However, row 3 has a sparsity of 6/10 03 60%, and row 4 has a sparsity of 4/10 or 40%. Since rows 3 and 4 have sparsity that is not lower than the threshold of 40%, these rows may be combined and processed via submat operations.

The sparse row processor 110 associates a sub-vector of an input vector with a sub-row of the identified row, where the sub-row comprises the non-zero entries of the identified row, and where entries in the sub-vector correspond to the non-zero entries in the identified row in a multiplication operation, and maps entries in the matrix to an engine formed from a memristor array 130. For example, for row 1, the sub-row may be a vector |2 7|. Since these non-zero entries are the first and seventh elements in row 1 of the matrix in Eqn. 1, the associated sub-vector of the input vector will comprise the first and seventh entries of the input vector. Similarly, for row 2, the sub-row may be a vector |1 4 3|. Since these non-zero entries are the second, seventh and tenth elements in row 2 of the matrix in Eqn. 1, the associated sub-vector of the input vector will comprise the second, seventh and tenth entries of the input vector.

The stream buffer 120 receives data related to sparse rows and submats for the input matrix. Such data may be received, for example, via a system controller (not shown). The stream buffer 120 receives input vectors, and queues sub-vectors of each input vector based on a position of associated sub-rows of identified sparse rows. In some examples, digital to analog converter (not shown) may be provided to generate analog representations of input vectors. A vector buffer may be provided to store the input vectors to be digitized by the DAC (or DACS).

The stream buffer 120 generally facilitates a hierarchical computation by determining when a particular sub-vector is to be provided to the engine, and activating each row of a single column in the engine based on a position of the sub-vector in the queue. In examples where the input matrix is not sparse, the input matrix is mapped as submats to a cluster of DPEs, and the same input vector is mapped to all the crossbars in the DPE. Such a submat mapping is generally symmetric across cluster architectures. However, in computations that involve sparse rows of a matrix, every cluster of a DPE requires a different input sub-vector. This is where the stream buffer 120 plays a role by maintaining a queue to map the sub-vectors to the associated rows.

Figure 3:
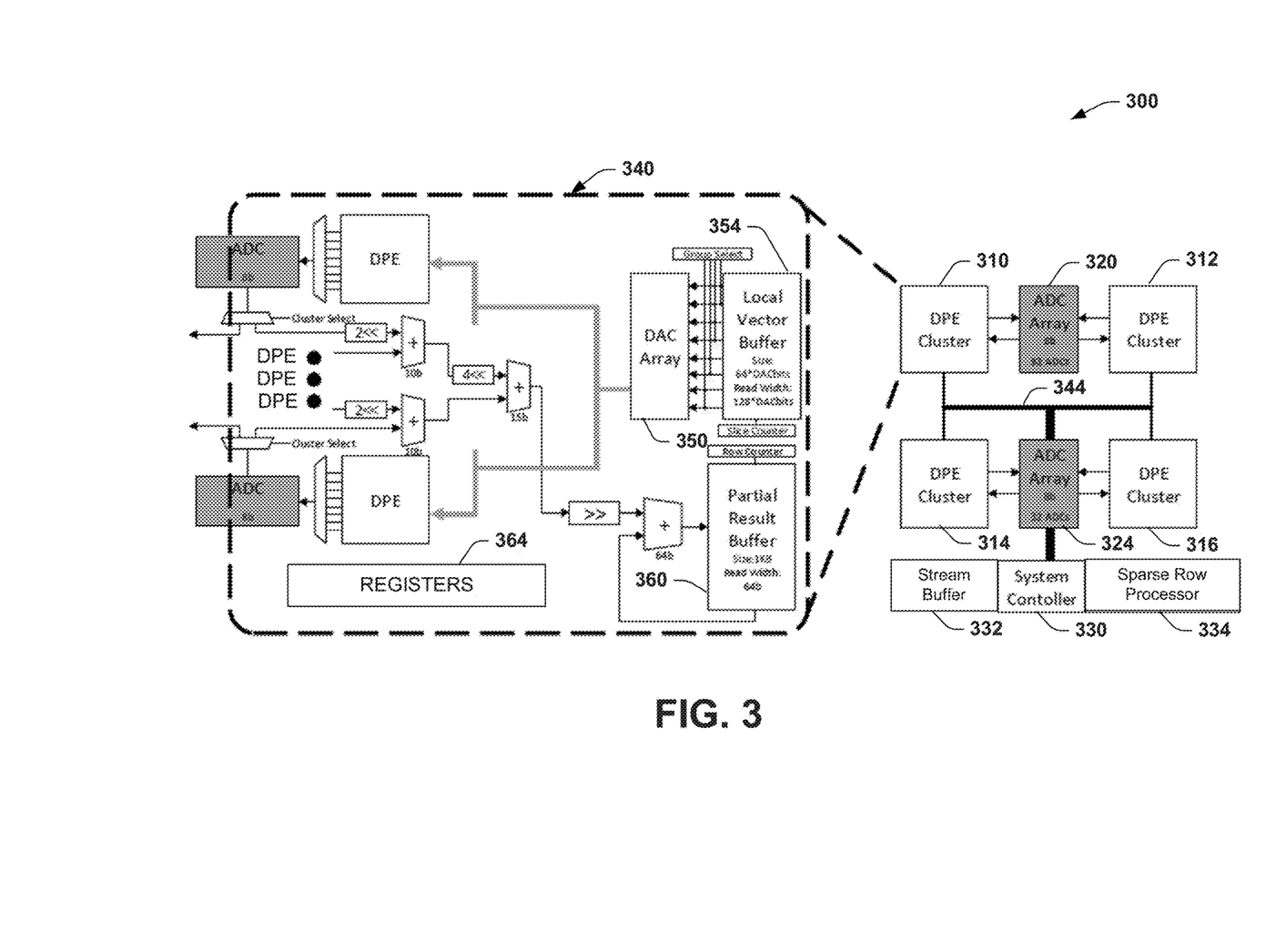
FIG. 3 illustrates an example of a circuit that utilizes cluster processing to perform hierarchical computations on sparse matrix rows via a memristor array.

Accordingly, the accelerator for sparse matrices may benefit from a mapping scheme and utilize a non-blocking global h-tree (as illustrated by h-tree 344 of FIG. 3) to interconnect clusters (e.g., cluster 310, cluster 312, cluster 314, and cluster 316 of FIG. 3). A set of engines (also referred to as DPEs) and associated circuits used to evaluate a sub-multiplication operation may be referred to as a cluster. As sub-vectors are streamed from the central stream buffer 120 (or stream buffer 332 of FIG. 3) to clusters with minimal buffering overhead in each cluster, it may be generally desirable to ensure a near-continuous flow of data to clusters. In the case of dense matrices, distribution of input vector to clusters is relatively straightforward. Since accesses to the centralized vector buffer benefit from high spatial locality, banking and interleaving of vector across banks will generally guarantee high bandwidth. Also, for example, as the same set of vector elements are used by submats along the row, h-tree bandwidth requirement may be low. However, for a sparse matrix, since each cluster operates on a different set of random vector elements, the stream buffer 120 may have to support high bandwidth even for random accesses. To avoid increasing the complexity of the local vector buffer in each cluster, the central stream buffer 120 may be utilized to assemble vector elements of all active clusters and distribute them through the h-tree. Also, the h-tree bandwidth may need to be increased either with more links or by operating at a higher frequency to send vectors to all active clusters.

The engine formed from the memristor array 130 computes analog multiplication results between sub-rows and their associated sub-vectors, where each column of the array is configured to hierarchically compute multiple multiplication results based on the queue. Generally, even though large matrices may include thousands of rows and columns, maximum non-zero elements in each row may be estimated to be much smaller in number. For example, one estimate may be less than 250 non-zero elements. Also, for example, when performing matrix-vector multiplication, the vector elements required for computation in one row may be different from vector elements used in any nearby rows. Hence, there may be no benefit in subdividing the matrix into submats, and broadcasting the same vector elements to nearby clusters, as most of these vector elements will likely never be used. To optimize the utilization of DPE cells, instead of subdividing the matrix into submats, it may be preferable to process each row of a sparse matrix entirely within a cluster. Thus each cluster computes a vector-vector multiplication for sparse rows, instead of a submat-vector multiplication. An analog to digital converter (ADC) (or converters or converter arrays) generates a digital value for the analog multiplication results.

Accordingly, in some examples, every element of rows processed in a cluster may be mapped across DPEs. With such an arrangement, the shared DAC array provides vector bits across DPEs. However, since a single DPE will have elements from multiple rows, with each row requiring separate vector bits, not every DPE column output may be valid. Accordingly, a key difference in operation between dense and sparse matrices is that for every DPE operation (100 ns access), only a subset of columns may be decoded by an ADC. For example, if a row element is 64b, then each DPE in the cluster will have 8b each, assuming 8 DPEs in a cluster and each DPE is configured with a one bit cell. After a DPE operation, the ADC processes only those columns where these 8b are mapped. Hence, the operating speed to process sparse matrices may be a fraction of what may be needed to process dense matrices.

When processing an entire row within a cluster, since the number of non-zero elements in each matrix row may be smaller than DPE rows, it may be possible to improve density by having multiple segments within a DPE, with each segment operating on different rows. To support DPE segments, hierarchical wordline may be utilized. Here, in the first iteration, rows 1 and 2 may be processed, followed by rows 2 and 3 in the second iteration. Generally, a segment with 16 and 32 columns may improve the storage density of sparse matrices to 89% and 62%, respectively.

As processing proceeds, aggregation of bitslice results continue to take place at the active h-tree and partial result buffer. When processing sparse matrix rows, even though each cluster throughput may be limited, as ADCs are operated at reduced frequency and hence power, it may be possible to have more active clusters for a given power budget, compared to the dense matrix case.

The engine formed from the memristor array 130 may be combined with other engines to form a cluster of engines. If a single engine is employed, results may be stored in a holding buffer, shifted, and then added to other results that are processed by the single engine. If multiple engines are employed shift and add operations may occur in parallel across an internal h-tree configuration within a cluster and/or across an external h-tree configuration connecting multiple clusters where cluster results are combined by an external controller.

In some examples, the sparse row processor 110 may identify rows that are not sparse rows of the matrix, and map a sub-matrix that is a portion of the input matrix comprising the rows that are not sparse to the engine, and the engine may compute analog multiplication results between vectors of the sub-matrix and the input vector. The sub-matrix in the DPE may be programmed from a portion of the input matrix. As used herein, the term input matrix refers to a matrix of values to be multiplied where the respective values are greater than the number of computing elements (e.g., rows/columns) that perform the multiplication. Thus, a sub-matrix represents a computing matrix that computes portions of input vectors from the input matrix as smaller computing values that may be consumed/processed (wholly or in part) within the sub-matrix.

A shifter shifts the digital value of the analog multiplication result (produced by the engine formed from the memristor array 130) a predetermined number of bits to generate a shifted result. An adder adds the shifted result to the digital value of another multiplication result to generate a combined multiplication result from the sub-matrix. A plurality of such engines may be combined to form computing clusters, where each cluster has its respective shifting and adding operations to pipeline results. Outputs from the respective clusters may be combined to form an overall result for the matrixes to be multiplied.

The engine formed from the memristor array 130 may be configured to perform a matrix dot product operation between the matrix and the input vector, in one example. In other examples, the respective engines may perform a matrix cross product operation between the matrix and the input vector or a multiply operation between two scalar values, for example.

Figure 2:
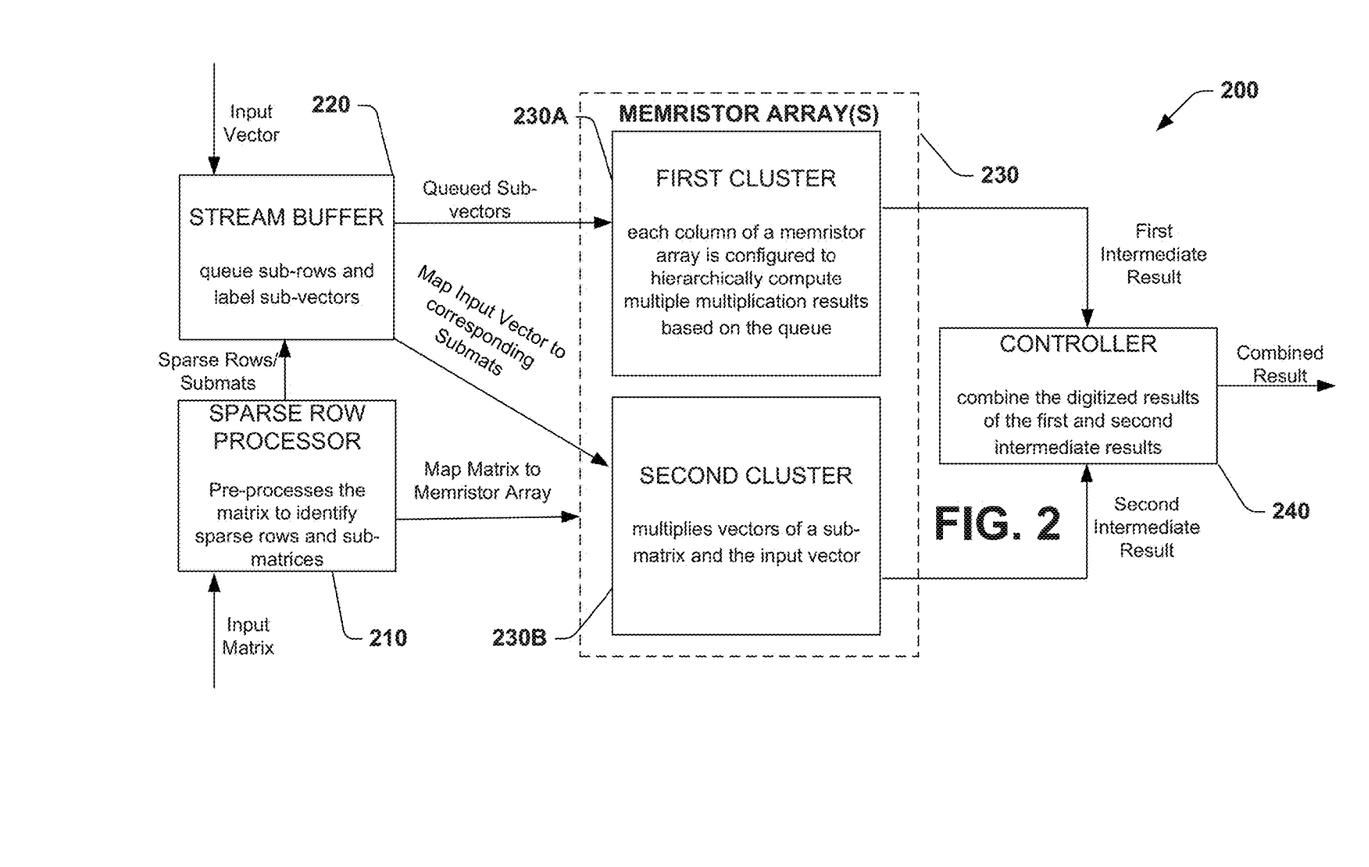
FIG. 2 is a functional block diagram illustrating another example of a circuit for hierarchical computations on sparse matrix rows via a memristor array.

FIG. 2 is a functional block diagram illustrating another example of a circuit 200 for hierarchical computations on sparse matrix rows via a memristor array. The term "hierarchical" as used herein, generally refers to a sequential activation of successive rows mapped to the same column of a DPE. Generally, one row is activated at a time. The sparse row processor 210 identifies a sparse row of an input matrix, where the identified row has a number of non-zero entries less than a threshold. The sparse row processor 210 associates a sub-vector of an input vector with a sub-row of the identified row, where the sub-row comprises the non-zero entries of the identified row, and where entries in the sub-vector correspond to the non-zero entries in the identified row in a multiplication operation, and maps entries in the matrix to an engine formed from a memristor array 230.

The stream buffer 220 receives data related to sparse rows and submats for the input matrix. Such data may be received from the sparse row processor 210, for example, via a system controller (e.g., controller 240). The stream buffer 220 receives input vectors, and queues sub-vectors of each input vector based on a position of associated sub-rows of identified sparse rows. In some examples, digital to analog converter (not shown) may be provided to generate analog representations of input vectors. A vector buffer may be provided to store the input vectors to be digitized by the DAC (or DACS).

As noted herein, the engine formed from the memristor array 230 may comprise a cluster of engines. In some examples, it may include a first cluster 230A and a second cluster 230B. The first cluster 230A computes a first intermediate result by multiplying a sub-vector of an input vector with a sparse row of an input matrix, where entries in the sub-vector correspond to non-zero entries in the sparse row in a multiplication operation. Generally, the first cluster 230A includes a plurality of engines formed from a memristor array to compute analog multiplication results between sparse rows and their associated sub-vectors, where each column of the array is configured to hierarchically compute multiple multiplication results based on the queue.

In some examples, the sparse row processor 210 may identify rows that are not sparse rows of the input matrix, and identify a sub-matrix from a portion of the input matrix comprising the rows that are not sparse. Such a sub-matrix may then be mapped to a cluster within the memristor array 230, such as, for example, second cluster 230B. The second cluster 230B computes a second intermediate result by multiplying vectors of the sub-matrix and the input vector. The output of each engine in the first cluster 230A may be combined to form combined multiplication result, the first intermediate result, representing multiplications from the vectors represented in the sparse rows of the input matrix. Likewise, the output of each engine in the second cluster 230B may be combined to form combined multiplication result, the second intermediate result, representing multiplications from the vectors represented in the non-sparse portions of the input matrix.

Generally, engines in each cluster may communicate across an active h-tree within the respective cluster of engines where the shift width varies at each level of the h-tree. For example, at one level of the h-tree the shift width may be two digits where at other levels of the h-tree, the shift width may be a number other than two. A configuration register (see e.g., FIG. 3) may be provided to dynamically specify a number of DAC bits utilized by the DAC, a number of cell levels in a respective matrix, a number of bits in the ADC output, and a number for shifting the number of bits in the shifter to generate the shifted result. A results buffer (not shown) may also be provided to hold the combined multiplication result from each cluster. Output from each cluster may be added to form an overall multiplication result for the matrix. When multiple clusters are processed, an analog to digital converter (ADC) array may be provided that is shared between at least two clusters to generate digital values for analog computation results from the respective clusters. A controller 240 may be provided to control the ADC array and to aggregate the computation results from the respective clusters to generate a combined result. For example, controller 240 may combine the digitized results of the first and second intermediate results obtained from the first cluster 230A and the second cluster 230B, respectively, to output a combined result.

Each engine in a cluster may include multiple rows for programming a an N dimensional vector representing a sparse row of the input matrix as N voltage inputs of the matrix which are multiplied as G column conductance values representing the M dimensional sub-vector of the input vector corresponding to the non-zero entries in the sparse row in a multiplication operation, where N, M, and G are positive integers respectively. The engine may be employed as a basic micro architecture of a dot product engine (DPE) although other types of multiplications are possible. Each row may be equipped with a Digital-to-Analog Converter to provide different read voltages determined based on the input vector to be multiplied. Also, every column may have a transimpedance amplifier, which in turn may be connected to an Analog-to-Digital Converter (ADC) to digitize the bit-line current from the respective columns. Generally, an ADC may require more silicon real estate than an array. To reduce the total area, an ADC may be operated at higher frequency and time multiplexed across multiple bit lines. Finally, a set of configuration registers (not shown) may specify a number of valid output bits (No) from the ADC, number of simultaneous rows that may be activated (NR), and bit density of cells (Cb). These configuration registers help tailor the engine to different applications dynamically.

FIG. 3 illustrates an example of a circuit 300 that utilizes cluster processing to perform hierarchical computations on sparse matrix rows via a memristor array. In this example, multiple DPE clusters, shown at 310, 312, 314, and 316, are employed to perform the sub-matrix processing described herein. Two of the clusters 310 and 312 may utilize a common ADC array 320 and two of the clusters 314 and 316 may utilize a common ADC array 324. A system controller 330 (or controller 240 of FIG. 2) and stream buffer 332 may be provided for managing and aggregating results within the respective clusters. In a smaller base cluster configuration where only two clusters are configured, the cluster 310 (e.g., first cluster 230A of FIG. 2) may compute a first intermediate result by multiplying a sub-vector of an input vector with a sparse row of an input matrix, where entries in the sub-vector correspond to non-zero entries in the sparse row in a multiplication operation. The cluster 312 (e.g., second cluster 230B of FIG. 2) may compute a second intermediate result by multiplying vectors of a sub-matrix and the input vector, where the sub-matrix is programmed from a portion of the input matrix comprising rows that are not sparse. The analog to digital converter (ADC) array 320 digitizes the first and second intermediate results, respectively from the clusters 310 and 312.

An example high-level block diagram of a cluster 310 is shown at 340. Each cluster may include a plurality of engines formed from a memristor array to compute analog multiplication results between a sub-vector of the input vector with a sub-row of a sparse row of the input matrix. Also, each cluster shown at 340 may include shifters to shift a digital value of a first cluster analog multiplication result a predetermined number of bits to generate a shifted cluster result. Also, each cluster shown at 340 may include adders to add the shifted cluster result to a digital value of a second cluster multiplication result to generate a combined multiplication result from the first cluster and the second cluster.

Likewise, each cluster, such as cluster 312, may include a plurality of engines formed from a memristor array to compute analog multiplication results between vectors of a sub-matrix and the input vector, where the sub-matrix is programmed from a portion of the input matrix. Also, each cluster may include shifters to shift a digital value of a first cluster analog multiplication result a predetermined number of bits to generate a shifted cluster result. Also, each cluster may include adders to add the shifted cluster result to a digital value of a second cluster multiplication result to generate a combined multiplication result from the first cluster and the second cluster.

As noted earlier, a sub-matrix may be sized such that its row and column counts are the same as or less than a given DPE. The number of DPEs in a cluster depends on the capacity of a memristor cell and the size of the matrix elements. These DPEs may be connected together by an active h-tree network in which every joint has a shift and add unit. The h-tree connections are shown in bold at 344.

Other than DPE components and h-tree, the cluster 340 also has a local vector buffer 354 and partial result buffer 360 to store input and buffer intermediate outputs. The local vector buffer 354 may store the part of the input vector that operates on the submat mapped to that cluster. The local vector buffer 354 may also store the sub-row of a sparse row, and/or a sub-vector of an input vector. The partial result buffer 360 may store and aggregate partial results due to DAC bit slices. It operates at the same rate as ADC sample rate so that the entire cluster may operate in lock step. Each cluster is highly customizable and may cater to a wide range of applications with different matrix dimensions and accuracy requirements. The DPE specifications such as DAC bits (DACb), cell levels (Mb), ADC output, and shift size may be dynamically configured via registers 364.

The circuit 300 shows one example multiplier/accelerator organization. The sparse row processor 334 may identify a sparse row of a matrix, where the identified row has a number of non-zero entries less than a threshold, and associate a sub-vector of an input vector with a sub-row of the identified row, where the sub-row comprises the non-zero entries of the identified row, and where entries in the sub-vector correspond to the non-zero entries in the identified row in a multiplication operation. The sparse row processor 334 may map entries in the matrix to the DPE clusters. For example, entries related to sparse rows may be mapped to a first collection of DPE clusters, whereas entries related to submats may be mapped to a second collection of DPE clusters.

The stream buffer 332 queues sub-vectors based on a position of associated sub-rows of identified sparse rows. The stream buffer 332 queues the input vectors and prompts the corresponding rows in the DPE to be activated. In some examples, when stream buffer 332 sends input vectors associated with a given row of the matrix, it sends a tag with the elements of the input vectors, where the tag indicates the row number. This tag may then activate that respective region of the DPE in the hierarchical computation.

The circuit 300 has multiple clusters 310-316 to operate on various sub-matrices and sparse rows in parallel. Since the output from each cluster is a complete fixed point value, the clusters are connected using a relatively simple h-tree network. Each joint in the h-tree 344 performs a simple add operation instead of shift-and-add performed within a cluster as shown at 340. The system controller 330 keeps track of various sub-matrices mapped to clusters, and various sub-rows of sparse rows that are mapped to clusters, and collects the aggregated result. The central controller 330 is also leveraged to track and avoid DPEs with permanent cell errors.

The mapping to DPEs may be illustrated as follows with reference to the example matrix in Eqn. 1. As previously noted, row 1 has a density of 20%, which is less than the prescribed threshold of 40%. Generally, in applications, the density is typically <1% and a DPE may be sized to have 64-256 rows and columns. The first row involving element 2 and 7 may be mapped to DPEs within a cluster as shown. In binary form, the sub-row |2 7| of the first row may be expressed as |010 111|. Assume that the corresponding sub-vector of the input vector is represented as |0011 1110|. According, the computation performed by, say the first cluster 230A of FIG. 2, or DPE cluster 310 of FIG. 3, is $$|010\ 111| * \begin{vmatrix} 0011 \\ 1110 \end{vmatrix} \qquad \text{(Eqn. 2)}$$

Considering the sub-row, since there is a 2×2 DPE with each DPE having one bit cells, two DPEs may be utilized to process the matrix. For example, DPE1 may have 0 and 1 mapped to its first column and 1 and 1 mapped to the second column, such as $$\begin{vmatrix} 0 & 1 \\ 1 & 1 \end{vmatrix},$$

and DPE2 may be $$\begin{vmatrix} 0 & 0 \\ 1 & 0 \end{vmatrix}.$$

The result computed by the all zero column here may be ignored. The contentions of DPE1 and DPE2 may be replicated four times, populating a total of eight DPEs in the cluster. Each of these DPEs may operate on a single bit of input vector for each row, and the final result may be calculated through a shift and add operation. These operations may be achieved by a DAC Array 350, a local vector buffer 354, and registers 364, as described in detail herein.

Figure 4:
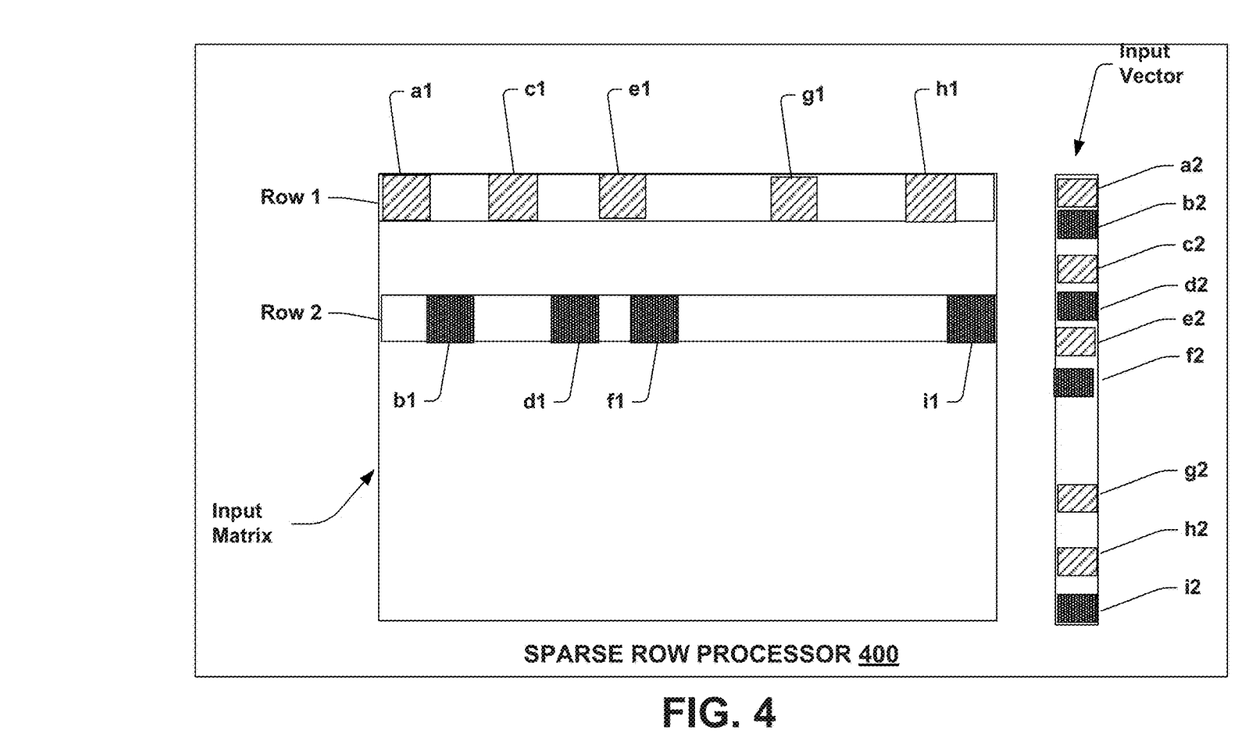
FIG. 4 illustrates an example of a sparse row processor operating on an input vector and an input matrix.
Figure 5:
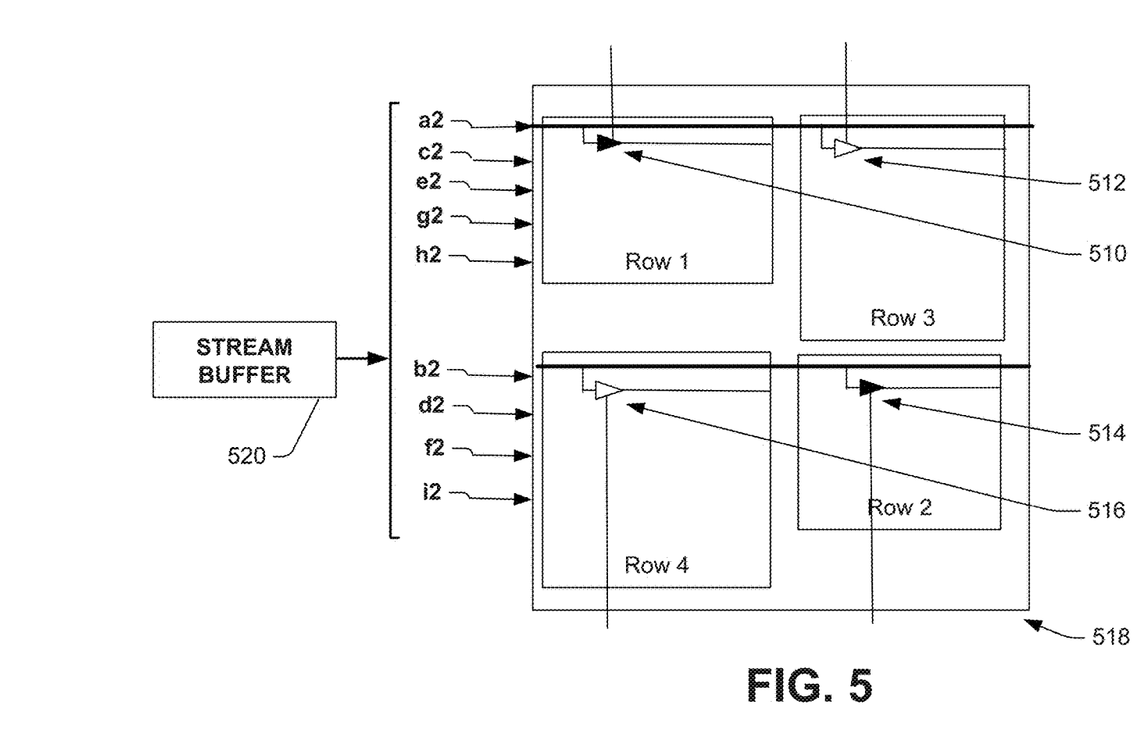
FIG. 5 illustrates an example of a circuit illustrating hierarchical computations via a memristor array.

FIGS. 4 and 5 are discussed to provide a context for further discussion of circuit 300. FIG. 4 illustrates an example of a sparse row processor 400 operating on an input vector and an input matrix. As illustrated, the non-zero entries in row 1 of the input matrix may comprise a1, c1, e1, g1, and h1. Accordingly, the sparse row processor 400 identifies a sub-row for row 1 to be |a1 c1 e1 g1 h1|. For the multiplication operation, the sub-vector corresponding to the non-zero entries in the identified row is |a2 c2 e2 g2 h2|, which is a portion of the input vector. Likewise, the non-zero entries in row 2 of the input matrix may comprise b1, d1, f1, and i1. Accordingly, the sparse row processor 400 identifies a sub-row for row 2 to be |b1 d1 f1 i1|. For the multiplication operation, the sub-vector corresponding to the non-zero entries in the identified row is |b2 d2 f2 i2|, which is another portion of the input vector.

FIG. 5 illustrates an example of a circuit illustrating hierarchical computations via a memristor array. The sparse row processor provides the sub-rows and associated sub-vectors to the stream buffer 520, which queues sub-vectors based on a position of associated sub-rows of identified sparse rows. Each sub-row is computed entirely within a cluster of DPEs. Accordingly, each cluster computes a multiplication of a row with a sub-vector. Each element of the rows are mapped across DPEs. However, since a single DPE will have elements from multiple rows, with each row requiring separate vector bits, not every DPE column output will be valid. Accordingly, only a subset of columns are decoded by an ADC.

For example, the first column in the DPE 518 comprises row 1 and row 4 which are programmed as conductance values along the first column of DPE 518. The stream buffer 520 provides labeled entries for the associated sub-vector, |a2 c2 e2 g2 h2|, which may be provided as voltages across rows of DPE 518. Likewise, the sub-vector associated with sub-row 4 may be mapped to DPE 518.

The second column of DPE 518 comprises row 3 and row 2 which are programmed as conductance values along the second column of DPE 518. The stream buffer 520 provides labeled entries for the associated sub-vector, |b2 d2 f2 i2|, which may be provided as voltages across rows of DPE 518. Likewise, the sub-vector associated with sub-row 3 may be mapped to DPE 518.

If all rows of DPE 518 were valid, then the column outputs may not represent a valid multiplication. Accordingly, at a first instance, the ADC decodes the sub-vectors associated with row 1 (as indicated by the filled-in arrow at 510) and row 2 (as indicated by the filled-in arrow at 514). At the first instance, the ADC does not decode sub-vectors associated with row 3 (as indicated by the non-filled arrow at 512) and row 4 (as indicated by the non-filled arrow at 516). Accordingly, a multiplication of row 1 with the input vector, and a multiplication of row 2 with the input vector may be computed. Likewise, at a second instance, a multiplication of row 4 with the input vector, and a multiplication of row 3 with the input vector may be computed.

As described herein, rows that have sparsity greater than a threshold may be processed as a submat operation by, say the second cluster 230B of FIG. 2, or DPE cluster 312 of FIG. 3.

Referring back to FIG. 3, after mapping the input matrix to DPE cells, which includes mapping sparse rows and submats of non-sparse portions of the matrix, the computation pipeline begins by sending input vector to NAC clusters using an input h-tree, for example. In some examples, the computation pipeline may begin by sending a sub-vector of an input vector to NAC clusters using another input h-tree, for example. Each cluster receives the portion of the input vector that operates on its submat, or respectively a portion of the sub-vector that operates on an associated sparse row, and stores it in the local vector buffer 354. In parallel, a bit slice of the input vector, or the sub-vector respectively, is sent to the DAC array 350 to initiate DPE computation.

After the DPE generates a result, each ADC output is placed on the first level in the active h-tree. The shift-add unit in each h-tree joint serves as pipeline stage for the values traversing the h-tree. Thus, the entire DPE cluster operates in lockstep with ADC sample rate. As clusters generate output, they are sent through the inter cluster h-tree, and the process is repeated for the next clusters until the problem completes. The circuit 300 (of FIG. 3) may communicate to a general purpose processor using, for example, traditional DDR bus controller (not shown). In an alternate aspect, clusters may be connected through other network topologies such as a grid, for example. The add operation may be performed on outputs of clusters and may be centralized or distributed depending on the topology and area constraint.

In some examples, the registers 364 dynamically specify a number of DAC bits utilized by the DAC, a number of cell levels in a respective matrix, a number of bits in the ADC output of the ADC array, and a number for shifting the number of bits to generate the shifted cluster result.

Figure 6:
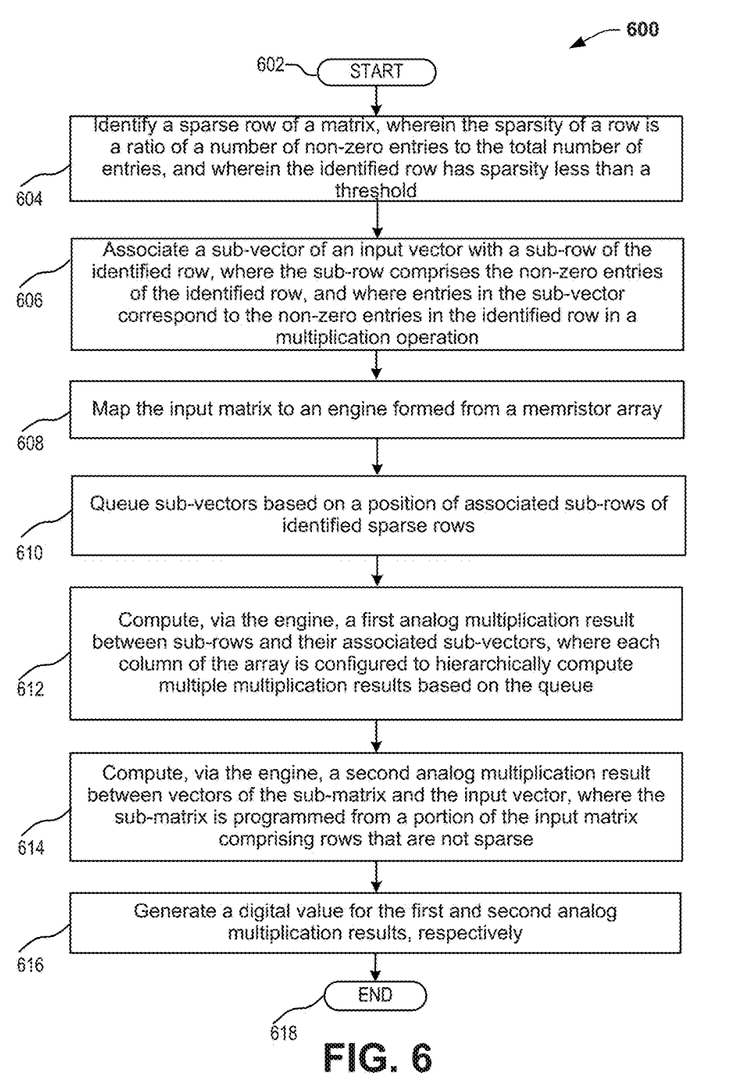
FIG. 6 is a flow diagram illustrating one example of a method for hierarchical computations on sparse matrix rows via a memristor array.

FIG. 6 is a flow diagram illustrating one example of a method for identifying candidate target storage containers. In some examples, such an example method may be implemented by a circuit such as, for example, circuit 100 of FIG. 1, and/or circuit 200 of FIG. 2. The method 600 may begin at block 602, and continue to end at block 618.

At 604, a sparse row of a matrix may be identified, where the sparsity of the row is a ratio of a number of non-zero entries to the total number of entries, and where the identified row has sparsity less than a threshold.

At 606, a sub-vector of an input vector may be associated with a sub-row of the identified row, where the sub-row comprises the non-zero entries of the identified row, and where entries in the sub-vector correspond to the non-zero entries in the identified row in a multiplication operation.

At 608, the input matrix may be mapped to an engine formed from a memristor array. As described herein, in some examples, this may include mapping sparse rows and submats of non-sparse portions of the matrix to respective DPE clusters.

At 610, sub-vectors may be queued based on a position of associated sub-rows of identified sparse rows.

At 612, a first analog multiplication result between sub-rows and their associated sub-vectors may be computed via the engine, where each column of the array is configured to hierarchically compute multiple multiplication results based on the queue. In some examples, hierarchically computing multiple multiplication results may include programming multiple rows of sparse rows in a single column of the array, and activating each portion of the single column based on a position of the sub-vector in the queue.

At 614, a second analog multiplication result between vectors of the sub-matrix and the input vector may be computed via the engine, where the sub-matrix is programmed from a portion of the input matrix comprising rows that are not sparse.

At 616, a digital value for the first and second analog multiplication results, respectively, may be generated.

As described herein, in some examples, the method may include shifting the digital value of first analog multiplication result a predetermined number of bits to generate a shifted result, and adding the shifted result to the digital value of the second multiplication result to generate a combined multiplication result from the first sub-matrix and the second sub-matrix.

In some examples, the method may include performing a matrix dot product operation between the matrix and the input vector, performing a matrix cross product operation between the matrix and the input vector, or performing a multiply operation between two scalar values.

Although specific examples have been illustrated and described herein, especially as related to numerical data, the examples illustrate applications to any storage container. Accordingly, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A circuit, comprising:
   a sparse row processor to:
      identify a sparse row of a matrix, wherein the identified row has a number of non-zero entries less than a threshold,
      associate a sub-vector of an input vector with a sub-row of the identified row, wherein the sub-row comprises the non-zero entries of the identified row, and wherein entries in the sub-vector correspond to the non-zero entries in the identified row in a multiplication operation, and
      map entries in the matrix to an engine formed from a memristor array;
   a stream buffer to queue sub-vectors based on a position of associated sub-rows of identified sparse rows;
   the engine to compute analog multiplication results between sub-rows and their associated sub-vectors, wherein each column of the array is configured to hierarchically compute multiple multiplication results based on the queue;

an analog to digital converter (ADC) to generate a digital value for the analog multiplication results computed by the engine;

a shifter to shift the digital value of the analog multiplication result a predetermined number of bits to generate a shifted result; and an adder to add the shifted result to the digital value of a second multiplication result to generate a combined multiplication result.

2. The circuit of claim 1, wherein:

the sparse row processor is to identify rows that are not sparse rows of the matrix, and map sub-matrix that is a portion of the input matrix comprising the rows that are not sparse to the engine; and the engine is to compute analog multiplication results between vectors of the sub-matrix and the input vector.

3. The circuit of claim 1, wherein the engine is to perform a matrix dot product operation between the matrix and the input vector, a matrix cross product operation between the matrix and the input vector, or a multiply operation between two scalar values.

4. The circuit of claim 1, further comprising a digital to analog converter (DAC) to generate analog representations of the sub-vectors.

5. The circuit of claim 4, further comprising a vector buffer to store the sub-vectors to be digitized by the DAC.

6. The circuit of claim 1, further comprising another engine that is configured as a cluster of engines with the engine, with the output of each engine in the cluster combined to form the combined multiplication result.

7. The circuit of claim 1, wherein the engines communicate across an active h-tree within the cluster of engines and the shift width varies at each level of the h-tree.

8. The circuit of claim 1, further comprising at least one other cluster of engines operating in parallel to the cluster of engines to process another portion of the input matrix, wherein output from each cluster of engines is added to form an overall multiplication result for the input matrix.

9. The circuit of claim 8, further comprising an analog to digital converter (ADC) array that is shared between at least two clusters to generate digital values for analog computation results from the respective clusters.

10. The circuit of claim 9, further comprising a system controller to control the ADC array and to aggregate the computation results from the respective clusters.

11. A circuit, comprising:

a first cluster to compute a first intermediate result by multiplying a sub-vector of an input vector with a sparse row of an input matrix, wherein entries in the sub-vector correspond to non-zero entries in the sparse row in a multiplication operation;

a second cluster to compute a second intermediate result by multiplying vectors of a sub-matrix and the input vector, wherein the sub-matrix is programmed from a portion of the input matrix comprising rows that are not sparse;

an analog to digital converter (ADC) to digitize the first and second intermediate results, respectively;

a stream buffer to queue sub-vectors based on a position of associated sub-rows of identified sparse rows;

a controller to combine the digitized results of the first and second intermediate results, respectively, wherein the first cluster includes a plurality of engines formed from a memristor array to compute analog multiplication results between sub-rows and their associated sub-vectors, wherein each column of the array is configured to hierarchically compute multiple multiplication results based on the queue;

a digital to analog converter (DAC) to generate analog representations of the vectors of the first and second cluster, respectively; and a configuration register to dynamically specify a number of DAC bits utilized by the DAC, a number of cell levels in a respective matrix, a number of bits in an ADC output of an ADC array, and a number for shifting the number of bits to generate a shifted cluster result.

12. The circuit of claim 11, further comprising a sparse row processor to identify the sparse row of the input matrix, wherein the identified row has a number of non-zero entries less than a threshold.

13. The circuit of claim 11, wherein the first and second clusters include:

a shifter to shift a digital value of a first cluster analog multiplication result a predetermined number of bits to generate a shifted cluster result; and an adder to add the shifted cluster result to a digital value of a second cluster multiplication result to generate a combined multiplication result from the first cluster and the second cluster.

14. A method, comprising:

identifying a sparse row of a matrix, wherein the sparsity of a row is a ratio of a number of non-zero entries to the total number of entries, and wherein the identified row has sparsity less than a threshold;

associating a sub-vector of an input vector with a sub-row of the identified row, wherein the sub-row comprises the non-zero entries of the identified row, and wherein entries in the sub-vector correspond to the non-zero entries in the identified row in a multiplication operation;

mapping the input matrix to an engine formed from a memristor array;

queuing sub-vectors based on a position of associated sub-rows of identified sparse rows;

computing, via the engine, a first analog multiplication result between sub-rows and their associated sub-vectors, wherein each column of the array is configured to hierarchically compute multiple multiplication results based on the queue;

computing, via the engine, a second analog multiplication result between vectors of the sub-matrix and the input vector, wherein the sub-matrix is programmed from a portion of the input matrix comprising rows that are not sparse;

generating a digital value for the first and second analog multiplication results, respectively;

shifting the digital value of first analog multiplication result a predetermined number of bits to generate a shifted result; and adding the shifted result to the digital value of the second multiplication result to generate a combined multiplication result from the first sub-matrix and the second sub-matrix.

15. The method of claim 14, further comprising performing a matrix dot product operation between the matrix and the input vector, performing a matrix cross product operation between the matrix and the input vector, or performing a multiply operation between two scalar values.

16. The method of claim 14, wherein hierarchically computing multiple multiplication results includes programming multiple rows of sparse rows in a single column of the array, and activating each row of the single column based on a position of the sub-vector in the queue.

* * * * *